United States Patent [19]

Dienes

[11] 4,358,634
[45] Nov. 9, 1982

[54] PROTECTIVE COVER FOR USE IN SEALED CABLE SPLICES

[75] Inventor: Zoltan B. Dienes, Annandale, N.J.

[73] Assignee: Thomas & Betts Corporation, Raritan, N.J.

[21] Appl. No.: 143,414

[22] Filed: Apr. 24, 1980

[51] Int. Cl.³ ............................................. H02G 15/18
[52] U.S. Cl. .................................... 174/88 R; 174/92; 138/128
[58] Field of Search ............... 174/88 R, 92, 136, 5 R, 174/138 F, 41, 70 A; 150/52R; 138/156, 128

[56] References Cited

U.S. PATENT DOCUMENTS

| 1,988,604 | 1/1935 | Merrill et al. | 174/5 R |
| 2,550,021 | 4/1951 | Rappl | 174/99 R X |
| 3,161,210 | 12/1964 | Loof | 138/128 |
| 3,249,679 | 5/1966 | Bogese | 174/5 |
| 3,519,728 | 7/1970 | Gillemot | 174/76 |
| 3,636,240 | 1/1972 | Quante et al. | 174/92 |
| 3,781,458 | 12/1973 | May | 174/84 C |
| 3,852,516 | 12/1974 | Vander Ploog et al. | 174/71 R |
| 3,935,373 | 1/1976 | Smith et al. | 174/77 R |
| 4,151,364 | 4/1979 | Ellis | 174/84 C |

Primary Examiner—A. T. Grimley
Assistant Examiner—D. A. Tone
Attorney, Agent, or Firm—Robert M. Rodrick; Salvatore J. Abbruzzese; Jesse Woldman

[57] ABSTRACT

A protective cover for use particularly in a sealed splice of electrical cables comprises a generally cylindrical, elongate tubular member having a wall the ends of which are in overlapping relation over a circomferential portion of the tubular member. A groove extends radially into the inner circumferential surface of the tubular member and axially therealong at least for a portion of the length of the member. It is preferred that the tubular member be formed from a pre-contoured sheet of rubber-like material, the inner contoured sheet surfaces being coated with a sealing material.

31 Claims, 6 Drawing Figures

PROTECTIVE COVER FOR USE IN SEALED CABLE SPLICES

BACKGROUND OF THE INVENTION

This invention relates to a protective cover for electrical connections and more particularly to a splice of electrical cables including such a cover for protecting the splice and for providing a sealed connection for the electrical cables.

Cables containing many small diameter wires are often used in telephone communication systems that are typically installed underground. All such cables capable of being installed underground must be sealed against moisture and otherwise protected against the hostile environment. Not infrequently, due to line failure or routine maintenance, one or more cables must be joined, i.e., many wires within spliced together. Thus, entry into the cable systems and effective resealing is necessary.

Currently, there are a variety of insulating covers and protectors for electrical connections, cable splices and the like. While effective in providing protection and a seal for the connections, installation of the known covers is relatively time-consuming often requiring specialized tools and equipment which in an underground tunnel of limited space are difficult to handle and operate.

One such known protector employs a rigid outer shell that is installed around the splice area and filled with urethane or other hard resins. The splice area is totally and permanently encapsulated and is not readily reenterable.

Another known closure utilizes a rigid outer cover, but is filled with a petroleum jelly or other similar, very viscous material. For access to the splice area, this petroleum jelly must be removed, creating problems in removal, temporary storage or disposal.

Another commonly used protector is a heat-shrinkable sleeve. In addition to requiring special heating tools, there is the potential for deterioration of the integrity of the material due to overheating. Also, the available heat shrinking materials for such applications are typically of high durometer to withstand the hostile environment, making re-entry as by slicing more difficult and limiting the flexibility of the spliced area.

SUMMARY OF THE INVENTION

It is a primary object of the present invention to provide a cover for protecting electrical connections and splices of electrical cables.

It is another object of the present invention to provide an environmentally sealed splice that is readily installed and re-openable.

In accordance with the present invention there is provided a protective cover for an electrical connection comprising a generally cylindrical, elongate tubular member of resilient, non-conductive material having a wall the ends of which overlap over a circumferential portion thereof. The inner circumferential surface of the tubular member has a recess extending radially therein and along at least a portion of the longitudinal extent of the tubular member.

In a particular use of the cover as a cable splice protector, it is preferred that the tubular member be formed from a pre-contoured sheet wherein the free sheet ends are formed to be in overlapping relation over a circumferential portion of the tubular member.

In accordance with another embodiment of the present invention a sealed splice of electrical cables comprises means connecting exposed conductors of the cables. Positioned over the connecting means and exposed conductors is a resilient elongate cover of electrically insulating material, a portion of the cover extending over the electrical cables. The cover includes a tubular member having a wall the ends of which are in circumferential overlapping relation. The inner circumferential surface of the member has a groove extending radially therewithin and axially along at least a portion of the longitudinal extent of the member. A wall portion of the groove engages axially one of the cables and a portion of the inner circumferential surface of the tubular member engages axially another one of the cables. Included in the splice is means for radially compressing the cover on the cables.

In a preferred aspect of the sealed splice, a plurality of smaller cables are electrically connected to a larger cable. The inner circumferential surface is provided with a plurality of grooves spaced about the axis of the tubular member in an arc of revolution, the grooves engaging the smaller electrical cables and pressing them in contact with the larger cable. A coating of sealing material is provided on the inner circumferential surface of the tubular member, on walls of the grooves and on an overlapping wall surface. It is preferable that the sealing material be pre-coated on these surfaces prior to installation of the cover on the cables.

BRIEF DESCRIPTION OF THE DRAWING

FIG. is a side elevational view of a sealed splice of electrical cables in accordance with the present invention, partly broken away at the cable ends to reveal conductors therein.

DETAILED DESCRIPTION OF THE PREFERRED EMBODIMENTS

Figure 1:
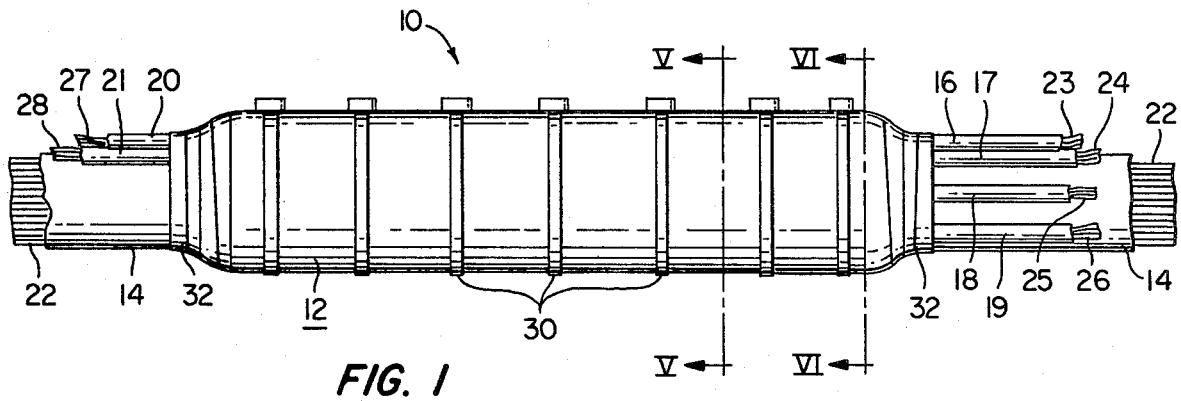

Referring to the drawing, there is shown in FIG. 1 in accordance with the present invention, a sealed splice indicated generally as numeral 10. A cover 12 sealably encloses an electrical cable 14 and protects the connection therein of electrical cables such as cables 16, 17, 18 and 19 entering the cover 12 on one side and cables 20 and 21 entering the cover on the other side. The cables are of conventional construction, each having an outer jacket of insulation, cable 14 having inner conductors 22, cables 16, 17, 18 and 19 having inner conductors 23, 24, 25 and 26, respectively and cables 20 and 21 having inner conductors 27 and 28, respectively. In the preferred embodiment, cables 16, 17, 18 and 19 as well as cables 20 and 21 are of approximately the same size and smaller than the cable 14. While the preferred arrangement of the splice 10 contemplates a connection of up to four smaller cables extending from each side of the cover 12, connection of more or less cables entering one or both sides of cover 12 is intended to be within the scope of the invention.

The cover 12 is secured around the cables to effect a sealed connection, as will be described, preferably by a plurality of spaced locking straps 30, radially tightened against the cover 12, the straps 30 being in the form of cable ties as described in U.S. Pat. No. 3,186,047 and assigned to the same assignee as is the present invention. Other radially compressive means, such as, tape and clamps may also be used to hold the cover 12 tightly around the cables. To provide additional sealing protection, both ends of the cover 12 may be covered by an adhesive tape 32 that overlaps the ends of the cover 12 and extends onto the outer insulation of the cables.

Figure 2:
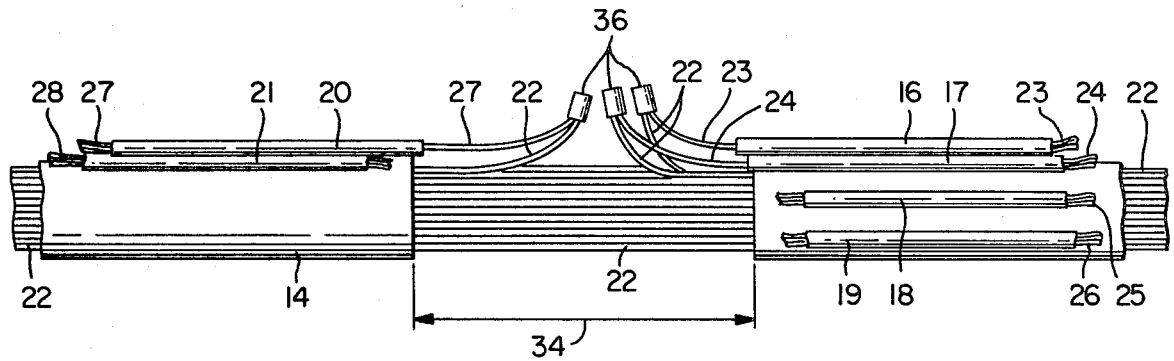
FIG. 2 is a view of the splice of FIG. 1 in a preliminary stage of preparation with the protective cover removed to show the connections of cable conductors.

In preparing the cable splice 10, the larger cable 14, as shown in FIG. 2, is stripped of its outer insulation for an axial portion designated by arrow 34 so as to expose the inner conductors 22. Similarly, the outer insulation of the smaller cables is removed to expose the inner conductors 23, 24, 25, 26, 27 and 28 for connection to the conductors 22. Although the conductors of all the smaller cables are connected, only the connections of cables 16, 17 and 20 are shown in FIG. 2 for purposes of clarity and illustration. The conductors 23, 24 and 27 of these cables, respectively are individually coupled to a conductor 22 as by a ferrule 36 or other standard connector as known in the art. The connected smaller cables are positioned on the cable 14 to extend substantially parallel and coaxial therewith. Subsequent to the connection of the conductors, it is preferable that the exposed connected conductors be covered with a layer of sealant tape (not shown in FIG. 2) or other suitable electrically insulating material. The outer insulation of the cable 14 adjacent both sides of the tape covered exposed portion 34 is also preferably covered by sealant tape, the smaller cables 16, 17, 18, 19, 20 and 21 being pressed against the tape for an axial extent on both sides respectively of the portion 34.

Figure 3:
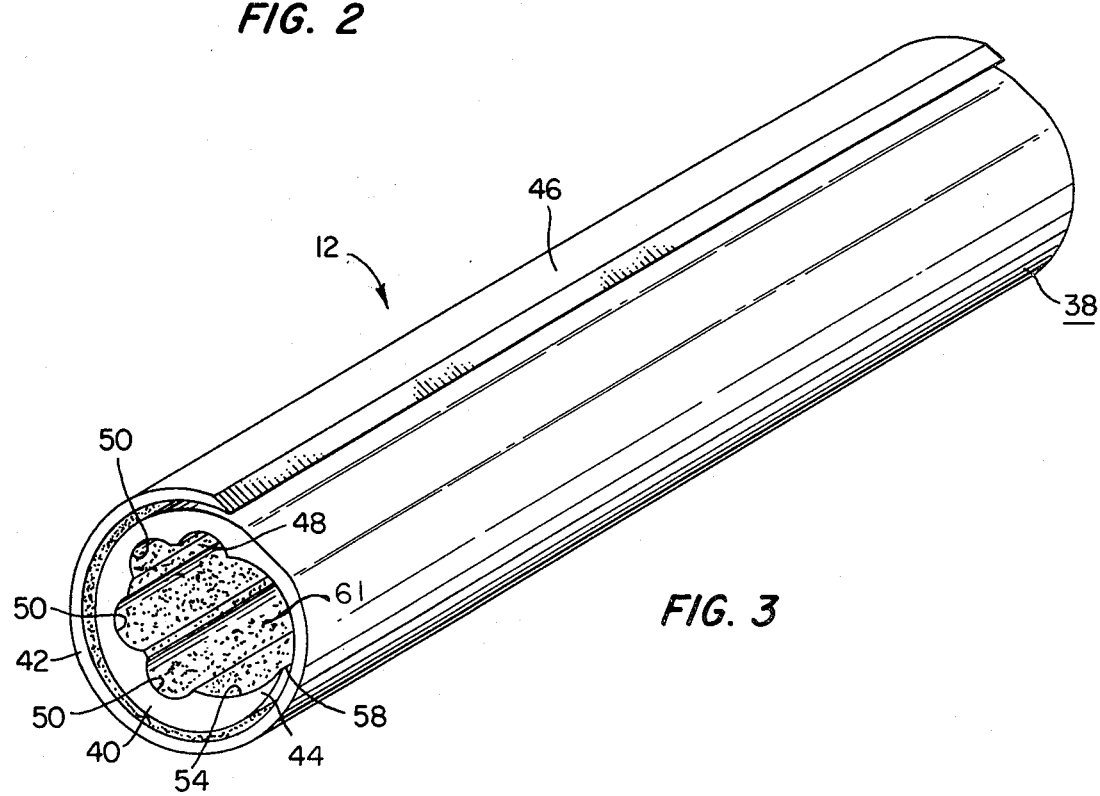
FIG. 3 is a perspective view of a preferred embodiment of the protective cover of the present invention.
Figure 4:
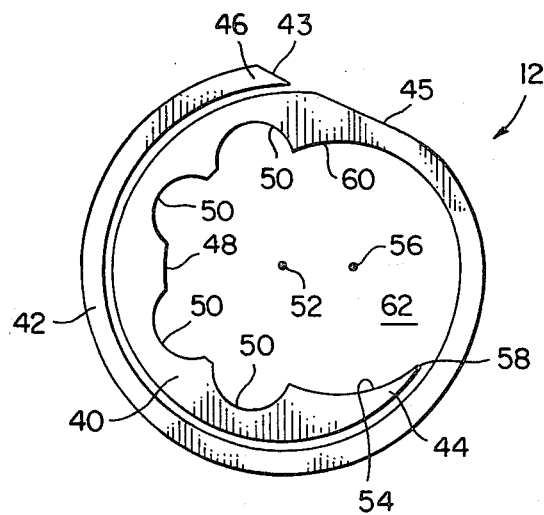
FIG. 4 is an end view of the protective cover of FIG. 3.

The taped connected cables are then covered by the protective splice cover 12, shown in more detail in FIGS. 3 and 4. In accordance with the invention, the cover 12 comprises a generally cylindrical, elongate tubular member 38 made of flexible, rubber-like electrically insulating material. Preferably, the member 38 is made of neoprene, although other resilient non-conductive, elastomeric materials such as polyvinylchloride may also be used.

The tubular member 38 is formed to have circumferentially overlapping wall portions 40 and 42, the free ends 44 and 46 respectively of these wall portions preferably overlapping in spiral fashion at least 180 degrees so as to provide a double-walled cylinder over a significant circumferential portion of the member 38. The overlapping wall portions 40 and 42 are unsecured and free to be moved radially relative to each other and may be opened completely for installation over the connected cables. A tapered portion 43 may be provided at the edge of free end 46 and a flat portion 45 on the outer surface of the wall 40 to facilitate reception of and tightening by the straps 30.

In the inner circumferential surface 48, there are provided a plurality of recesses or grooves 50 that extend radially into the inner circumferential surface 48 and axially along the member 38. The grooves 50 are preferably arcuate and are spaced in an arc of revolution about the central axis 52 of the tubular member 38. On the inner surface of the free end 44 of the overlapped wall 40, there is an axially extending arcuate surface portion 54 having a radius of curvature of which the center 56 is offset with respect to the tubular member axis 52. The arcuate portion 54 is formed to have a radius of curvature less than that of the outer circumferential surface of the overlapped wall 40 and to intersect such outer wall surface of the free end 44 to form thereby a relatively sharp edge 58 extending longitudinally along the tubular member 38.

On the inner circumferential surface of the overlapped wall 40 there is provided at a location diametrically opposite the arcuate surface portion 54 and through its offset center 56 an arcuate surface section 60 extending axially along the member 38. Preferably, the arcuate section 60 is formed to have the same radius of curvature as the arcuate portion 54 with its center coinciding with center 56. Thus, the arcuate portion 54 and the arcuate section 60 together define an arcuate cavity 62 extending axially along the member 38 and being offset from the central member axis 52. The grooves 50 are formed to be in facing relation to the cavity 62 the walls of the most distant grooves 50 spaced along the arc of revolution intersecting the surfaces of the arcuate portion 54 and arcuate section 60, respectively. In the preferred embodiment, the radius of curvature of the grooves 50 is smaller than the radius of curvature of the cavity 62.

The elongate tubular member 38 is formed to have a longitudinal dimension greater than the exposed conductor portion 34 (FIG. 2). In the preferred embodiment where the connected conductors and exposed portion 34 are covered with tape, the tubular member is formed preferably to have a length such that the ends of the member 38 extend axially beyond the edges of the tape on the cables. The tubular member 38 may, however, have a length less than the axial extent of the tape such that the member 38 lies completely over taped portions.

In the preferred embodiment and for ease of manufacture, the grooves 50, arcuate portion 54 and arcuate section 60 all extend axially the full length of the member 38. The grooves 50, arcuate portion 54 and arcuate section 60 may, however, be formed to extend axially along a portion of the length of the member 38 such as at each end thereof.

The preferred configuration of the tubular member 38 is formed by extruding a sheet of neoprene forming thereby on such sheet the contours of the inner circumferential surface 48 as well as the shape of the grooves 50, the arcuate portion 54 and the arcuate section 60. To effect a moistureproof seal, it is preferred that the entire pre-contoured surface as shown in FIG. 3 be coated with a sealing member 61, such as, uncured butyl sealant, capable of adhering to itself and other materials and of sealing out moisture. A sheet of readily removable release paper may be applied over the sealant to protect the coated surfaces and facilitate handling as well as storage of the member.

To complete the preparation of the splice 10, the cover 12 is, upon removal of the release paper, placed around the connected cables and then closed thereover. The straps 30 are then secured around the outer surface of the cover 12 in known manner to radially compress the cover 12 and effect the sealed splice 10. To further assure sealing of the splice 10, beads of additional sealant may be applied between the smaller cables positioned around the larger cable 14 before installation of the cover 12 over the cables.

Figure 5:
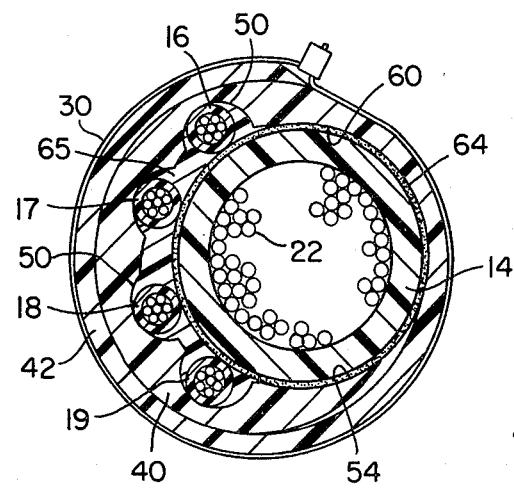
FIG. 5 is a cross-sectional view of the splice of FIG. 1 as seen along viewing lines V—V.

In FIG. 5 there is shown a cross-section of the completed splice 10 at a location of the cables adjacent the exposed portion 34 where the layer of sealant tape 64 (not shown in FIG. 2) overlaps onto the outer insulation of the cable 14. Upon tightening of the straps 30 around the cover 12, the overlapping wall portions 40 and 42 are brought into contact, the sealing material being compressed therebetween. The arcuate portion 54 and the arcuate section 60 with sealing material thereon compressively engage portions of the tape 64 wrapped around the larger cable 14. The walls of the grooves 50 with sealing material compressively engage portions of the smaller cables 16, 17, 18 and 19 and tightly hold these smaller cables against the tape 64 around the larger cable 14. Additional sealant 65 fills the voids between the smaller cables and combines with the sealant on the inner surfaces to provide an effective seal.

Figure 6:
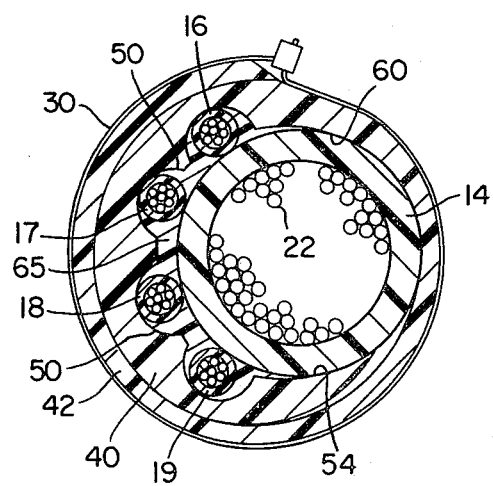
FIG. 6 is a cross-sectional view of the splice of FIG. 1 as seen along viewing lines VI—VI.

In FIG. 6, the sealed splice 10 is shown in cross-section at the end of the cover 12 that is formed in the preferred embodiment to extend beyond the ends of the tape covering the exposed conductors. At this region of the splice 10, there being no tape 64, the grooves 50 with sealant tightly engage the smaller cables 16, 17, 18 and 19 with filler sealant 65 therebetween while the arcuate portion 54 and arcuate section 60 with sealant both contact the larger cable 14.

It should now be appreciated that the splice of the present invention not only provides the desired protection and seal against a hostile environment, but also ease of installation by use of a pre-coated cover 12. Additional advantage is provided by the cover 12 in the wide range of electrical cables that can be effectively sealed due to its flexibility and specifically contoured inner surfaces. Telephone cables vary in diameter depending on the number of individual lines or pairs of lines included within the cable insulation. For example, one size cover can effectively seal four smaller cables at each end, each smaller cable having 4 to 5 pairs of lines to one larger cable having a range of from 25 to 200 pairs of lines. Another single size cover can seal the same smaller cables to a larger cable having a range of from 300 to 900 pairs of cables. Thus, the range of larger cables having between 25 and 900 pairs can be sealed with only two size covers. In comparison, for the same range of larger cables, it would take four different sizes of the available heat-shrinkable covers.

Although in the preferred embodiment the cover is pre-coated with sealing material, other sealing techniques may be used in which no sealant is pre-applied to the cover. For example, it may be desirable to enclose a cover having no sealant thereon with a tape having suitable adhesive and sealing materials thereon to not only effect the seal but also provide the compressive securement, eliminating thereby the use of the straps 30.

Various other changes to the foregoing, specifically disclosed embodiments and practices will be evident to those skilled in the art. Accordingly, the foregoing preferred embodiments are intended in an illustrative and not in a limiting sense. The true spirit and scope of the invention are set forth in the following claims.

What is claimed is:

1. A protective cover for an electrical connection, comprising a generally cylindrical, elongate tubular member of resilient, non-conductive material having a wall the ends of which overlap over a circumferential portion of said member, the facing surfaces of said overlapping wall portion being relatively smooth, the inner circumferential surface of said member having a recess extending radially therein and axially along at least a portion of the longitudinal extent of said member, and a sealant on a relatively smooth wall surface portion of said member at the overlapping portion of said wall.

2. A protective cover according to claim 1, further including in said member an arcuate cavity coextending axially with said recess, said cavity having a radius of curvature of which the center is offset from the axis of said tubular member.

3. A protective cover according to claim 2, wherein said cavity is defined by an arcuate inner surface portion at the end of the overlapped wall and an arcuate surface section on the inner wall surface of said member diametrically opposite said arcuate surface portion through said offset center.

4. A protective cover according to claim 3, further including a plurality of such recesses in said inner circumferential surface.

5. A protective cover according to claim 4, wherein said recesses are disposed in an arc of revolution about the longitudinal axis of said member in facing relation to said cavity.

6. A protective cover according to claim 5, wherein said recesses are arcuate having radii of curvature less than the radius of curvature of said cavity.

7. A protective cover according to claim 6, wherein said recesses and said cavity extend axially throughout the length of said member.

8. A protective cover according to claim 1, further including a sealant on the inner circumferential surface of said member and on the walls of said recess.

9. A protective cover according to claim 1 wherein the ends of said wall overlap for a radial extent of at least 180 degrees.

10. A cable splice protector, comprising a pre-contoured sheet of flexible, non-conductive material formed into a generally cylindrical, elongate tubular member, the free ends of said sheet being in overlapping relation over a circumferential portion of the member, the surface portion of said sheet defining the inner circumferential surface of said member having therewithin a curved groove extending axially along at least a portion of the longitudinal extent of said member, said overlapped free end of said sheet having on its inner surface an arcuate surface portion coextending axially with said groove, said arcuate portion having a radius of curvature different from that of said groove such that said arcuate portion intersects the outer surface of said sheet at said overlapped free end forming thereby a relatively sharp edge thereat.

11. A cable splice protector according to claim 10, further including a plurality of such grooves in said surface portion such that upon formation of said tubular member said grooves are spaced in an arc of revolution about the longitudinal axis of said tubular member.

12. A cable splice protector according to claim 11, wherein the inner circumferential surface of said member has in diametric facing relation to said arcuate portion an arcuate section having approximately the same radius of curvature as said arcuate portion and coextending axially therewith.

13. A cable splice protector according to claim 12, wherein the radii of curvature of said grooves are less than the radius of curvature of said arcuate surface portion and said arcuate surface section.

14. A cable splice protector according to claim 13, wherein a wall portion of one of said grooves intersects the arcuate surface portion.

15. A cable splice protector according to claim 14, wherein a wall portion of the groove most distant along the arc of revolution from the groove intersecting said arcuate surface portion intersects the arcuate surface section.

16. A cable splice protector according to claim 12, wherein said grooves, said arcuate surface portion and said arcuate surface section extend axially the length of said tubular member.

17. A cable splice protector according to claim 10, wherein the overlapping free end of said sheet extends circumferentially around the overlapped free end at least 180 degrees.

18. A splice protector according to claim 10, wherein the surface of said pre-contoured sheet formed radially inwardly includes a coating of sealant thereon.

19. A sealed splice of electrical cables, comprising:
means connecting exposed conductors of the cables;
a resilient elongate cover of electrically insulating material positioned over said connecting means and said exposed conductors, a portion of said cover extending over said electrical cables, said cover comprising a generally cylindrical, tubular member having a wall the ends of which are in circumferentially overlapping relation, the inner circumferential surface of said member having a groove extending radially therewithin and axially along at least a portion of the longitudinal extent of said member, a wall portion of said groove engaging axially one of said cables and a portion of the inner circumferential surface of said tubular member engaging axially another one of said cables; and
means for radially compressing said cover on said cables.

20. A sealed splice according to claim 19, further including sealing means for sealing said cover to said cables and for sealing overlapping portions of the wall of said tubular member together.

21. A sealed splice according to claim 19, wherein a smaller cable is spliced to a larger cable, the outer insulation of said larger cable being stripped axially along a predetermined length to expose a conductor to be attached to a conductor of said smaller cable, said cover being of longitudinal dimension to extend axially beyond said exposed larger cable portion at both ends of said cover thereof and over the outer insulation of said larger cable, said smaller cable being positioned substantially parallel with said larger cable and coextending with said larger cable within one end of said cover.

22. A sealed splice according to claim 21, wherein the end of the overlapped wall has an arcuate portion on its inner surface coextending axially with said groove, said arcuate portion having a radius of curvature the center of which is offset from the axis of said tubular member, the tubular member having on its inner circumferential surface at a location diametrically opposite said arcuate portion through said offset center an arcuate section having a radius of curvature approximately the same as that of said arcuate portion, said arcuate portion and said arcuate section engaging a portion of said larger cable, an axial portion of said smaller cable being engaged by a wall portion of said groove.

23. A sealed splice according to claim 22, wherein a plurality of smaller cables are spliced to said larger cable, said smaller cables coextending axially with said larger cable at least within one end of said cover, said splice further comprising a plurality of such grooves engaging said smaller cables, said grooves being spaced in the inner circumferential surface of said tubular member in an arc of revolution about the axis of said tubular member at a location facing the offset center defined by said arcuate portion, said smaller cables contacting peripherally said larger cable.

24. A sealed splice according to claim 23, wherein said grooves are arcuate and have radii of curvature less than the radius of curvature of said arcuate portion.

25. A sealed splice according to claim 24, wherein said grooves, said arcuate portion and said arcuate section extend axially along the length of said tubular member.

26. A sealed splice of electrical cables wherein a plurality of smaller cables are electrically connected to a larger cable, the larger cable having an axial portion of its outer insulation removed to expose conductors for connection to conductors of the smaller cables, the smaller cables extending coaxially with said larger cable on both sides of said exposed portion of said larger cable, said splice comprising:
means connecting exposed conductors of said smaller and larger cables;
a layer of electrically insulating material covering said connecting means and said exposed conductors and on the outer insulation of said larger cable adjacent both sides of the exposed portion thereof;
a flexible, non-conductive elongate cover positioned over said layer, said cover comprising a generally cylindrical tubular member having a wall the ends of which circumferentially overlap, the inner circumferential surface of said tubular member having a plurality of grooves extending radially therewithin and along at least a portion of the longitudinal extent of said tubular member, said grooves being spaced about the longitudinal axis of said tubular member in an arc of revolution and engaging the smaller cables, a portion of the inner circumferential surface of said tubular member engaging a portion of the insulating layer around said larger cable, said smaller cables contacting a portion of the insulating layer around said larger cable around a peripheral portion thereof;
a coating of sealing material on the inner circumferential surface of said tubular member, on the walls of said grooves and on an overlapping wall surface; and
means radially compressively engaging said cover for effecting sealed contact between said cover and said layer and between said overlapping wall of said cover.

27. A sealed splice according to claim 26, further including on the inner circumferential surface on said tubular member an arcuate section having a radius of curvature the center of which is offset from the axis of said tubular member and, on the inner surface of the end of said overlapped wall, an arcuate surface portion having a radius of curvature approximately the same as that of said arcuate section, said arcuate portion and said arcuate section engaging a portion of the insulating layer around said larger scale.

28. A sealed splice according to claim 26, wherein said cover extends axially beyond the insulating layer at least at one end thereof and over an axial portion of the larger and smaller cables, said arcuate portion, said arcuate section and said grooves coextending axially to the end of said cover being over said larger and smaller cables such that said arcuate portion and said arcuate section with sealing material thereon engage said larger cable and said grooves with sealing material thereon engage said smaller cables, a seal being effected therebetween by said radial compressing means.

29. A sealed splice according to claim 26, wherein said grooves, said arcuate portion and said arcuate section extend axially throughout the length of said cover.

30. A sealed splice according to claim 26, wherein said layer of electrically insulating material comprises an adhesive tape.

31. A protective cover for an electrical connection, comprising a generally cylindrical, elongate tubular member of resilient, non-conductive material having a wall the ends of which overlap over a circumferential portion of said member, the inner circumferential surface of said member having a plurality of recesses extending radially therein and axially along at least a portion of the longitudinal extent of said member, said recesses being spaced radially about a first longitudinal axis, and a cavity defined by a portion of the inner circumferential surface, said cavity being centered about a second longitudinal axis spaced from said first axis.

* * * * *